May 26, 1936.  F. W. EDWARDS  2,042,216
BALL CHECK VALVE
Filed May 10, 1935
FIG. 1.
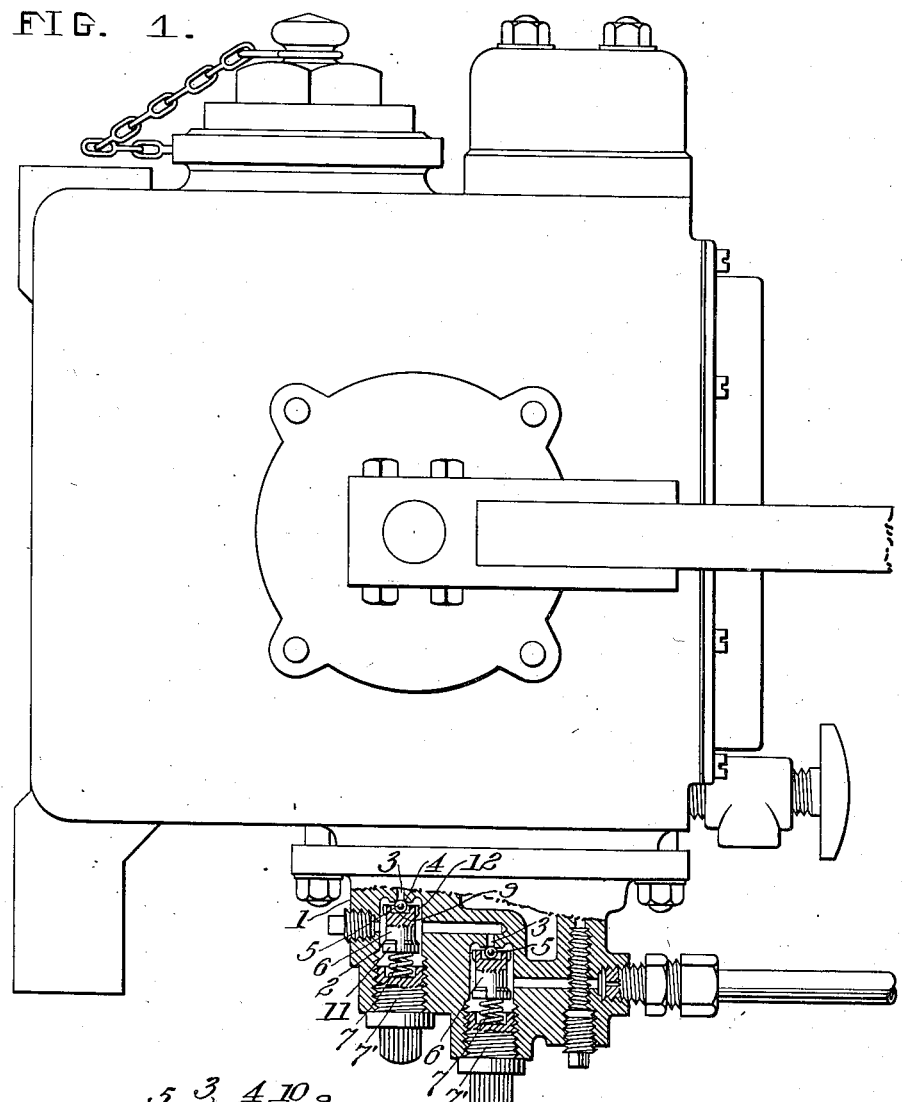
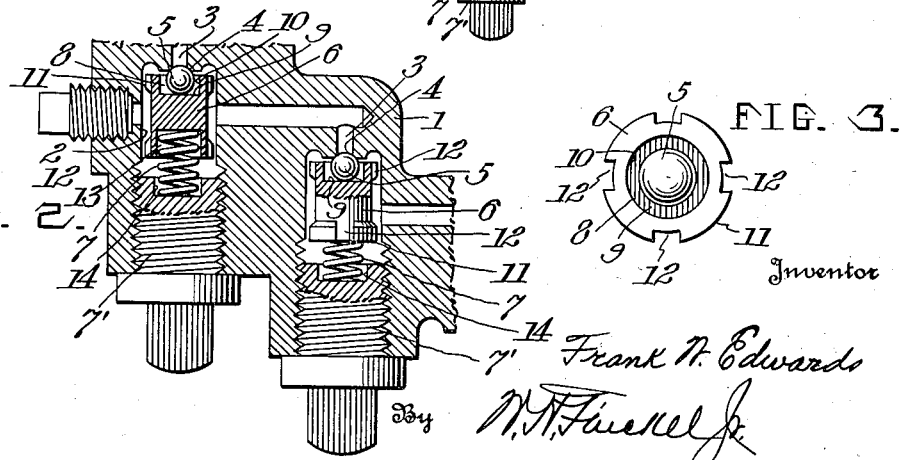
FIG. 2.
FIG. 3.
Inventor
Frank W. Edwards
By W. W. Fuszell Jr.
Attorney Patented May 26, 1936

2,042,216

UNITED STATES PATENT OFFICE 2,042,216

BALL-CHECK VALVE

Frank W. Edwards, Chicago, Ill., assignor to The Ohio Injector Company of Illinois, Chicago, Ill., a corporation of Illinois Application May 10, 1935, Serial No. 20,873

4 Claims. (Cl. 251—121)

This invention relates to check valves, and particularly to check valves of the positively or spring seated ball-check type.

Ball-check valves as ordinarily constructed are subject to faulty operation after relatively short periods of continued use, by reason of the fact that substantially the same surface area of the ball repeatedly contacts with the ball seat resulting in grooving or other marring of the spherical surface of the ball and such faulty seating as to cause leakage.

This is particularly true where, as in ball-check valves of simple construction, the ball is projected against its seat by a helical spring one terminal coil of which contacts directly with the surface of the ball. Such contact will produce frictional engagement with the ball, and will prevent the rotation thereof necessary to present different portions of the ball surface to the seat.

It is also true of those types of ball-check valves in which the ball is mounted in or upon a carrier, cage or follower of such a nature as to provide for rotation of the ball substantially upon its center, but in which frictional engagement between the ball and its carrier, cage or follower is often sufficient to prevent such desired rotation.

The object of the present invention is to provide in a ball-check valve such an assembly of parts that the ball is relatively free, not only for rotation about its center, but for a limited lateral rolling movement, thus obviating the faults present in ball-check valves of known types and lengthening the efficient operative life of the valve by providing for practically certain rolling movement of the ball every time it is unseated, thereby ensuring the presentation of a different portion of the surface area of the ball to the seat at each seating movement.

To this end the invention contemplates a ball-check valve including, as essential elements, a ball and a follower, the follower being provided with a recess the bottom of which furnishes a surface against which the ball rests, and upon which it is capable of having a limited rolling movement, as distinguished from a rotative movement around its center only, the side wall of the recess being normally sufficiently remote from the periphery of the ball to accommodate such limited rolling movement, while at the same time preventing escape of the ball from the follower and ensuring registry of the ball with its seat during seating movement; and the invention contemplates, further, various structural details and refinements of assembly of parts, all as will be hereinafter explained more fully and finally claimed.

One of the advantageous uses of the ball-check valve of the invention is in combination with lubricators of the mechanical force feed type, such as are used on railway locomotives and other heavy machinery where the lubricant is supplied to the part to be lubricated under a pressure sufficient to overcome the pressure at the point of delivery, for example, to the valve chamber of a locomotive engine cylinder. In such installations it is customary to provide what is known as a terminal check (a relatively high pressure check valve) at the delivery end of the lubricant supply conduit in order to prevent back pressure in such conduit.

With the ball-check valve of the invention incorporated in the lubricator proper, in combination with the connection for the delivery conduit thereto, the provision of such terminal checks is dispensed with.

In view of this particular applicability of the valve of the invention, it has been illustrated in the drawing in combination with a mechanical force feed lubricator similar to that disclosed in the patent of Frank W. Edwards and Fordyce B. Farnworth, No. 1,881,353, granted October 4, 1932, but it will be understood that the applicability of the invention is not to be construed as thus limited.

In the accompanying drawing illustrating the invention, in the several figures of which like parts are similarly designated, Figure 1 is an end elevation of a lubricator of the type mentioned, a portion thereof being shown in section to illustrate the application thereto of the ball-check valve of the invention.

Fig. 2 is an enlarged fragmentary sectional view of a portion of the parts shown in section in Fig. 1; and Fig. 3 is a greatly enlarged top plan view of the ball follower and ball assembly.

As shown, the ball-check valve of the invention comprises a housing 1 of any appropriate type, here shown as a feed manifold attached to the bottom of a lubricator, this housing provided with a bore 2 terminating in a fluid passage 3 provided with a valve seat 4 against which the ball 5 carried by a follower 6 is normally held seated by a spring 7 backed up by a screw plug 7' which closes the screwthreaded end of the bore 2.

Referring particularly to the showing of the ball-check valve at the left of Fig. 2, it will be seen that the follower 6 is provided at its upper end with a recess 8, the bottom 9 of which furnishes a bearing surface to receive and support the ball 5. The recess 8 is preferably cylindrical (see Fig. 3) and its diameter is sufficiently greater than the diameter of the ball 5 to permit a limited but relatively free lateral rolling motion of the ball upon the bearing surface 9. It will be apparent, furthermore, that the depth of the recess is such as to preclude the possibility of escape or separation of the ball from the follower during the reciprocation of the parts incident to seating and unseating movement. The surface 9 is preferably flat, and thus the ball 5 makes only a point contact therewith and avoids friction which would retard its free rolling movement.

The clearance between the ball 5 and the side wall 10 of the recess 8 is such that although the limited free rolling movement of the ball is provided for, as pointed out, this movement cannot be so great as to misalign the ball axially of the bore 2 sufficiently to result in its failure to properly register with the seat 4 of the fluid passage 3. In furtherance of this feature of the invention, the relative diameters of the bore 2 and the follower 6, and the length of the follower, are such as to ensure relatively true axial movement of the follower in the bore, and prevent jamming. Thus the flat bearing surface 9 will always be substantially normal to the axis of the bore and the ball will roll freely over this surface.

Sufficient clearance between the side wall of the bore and the outer surface of the follower is provided to permit fluid to pass the follower when the valve is unseated, and the guide flanges 11 of the follower are preferably, although not necessarily, notched, as indicated at 12, to more readily accommodate the flow of fluid.

The upper end of the spring 7 seats at the lower end of the follower in a recess 13 therein, and the opposite end of this spring seats in a somewhat similar recess 14 in the plug 7'. This arrangement prevents escape of the spring or its possible misalignment with the parts, and furnishes an additional guiding means for the follower and ball.

It will thus be seen that the formation and arrangement of the parts is such as to ensure effective operation of the valve, while at the same time providing for such free rotative and rolling movement of the ball as to permit it to present a different portion of its surface area to the seat at each seating operation, thus tending to even wear throughout the entire surface of the ball, and resulting not only in better and more effective operation of the valve but in longer life of the parts.

Various changes are contemplated as within the spirit of the invention and the scope of the following claims.

What I claim is:—

1. In a ball check valve, a valve housing including a bore terminating in a fluid passage provided with a valve seat, and an automatically operating ball check assembly arranged in said bore and including a follower and a ball, said ball arranged between said follower and said valve seat, said follower provided at its end adjacent to said ball with a recess of a diameter greater than the diameter of said ball and terminating in a bearing surface to receive and support said ball in free lateral rolling relation thereto, the depth of said recess being at least equal to the radius of said ball and providing a side wall of uniform diameter throughout its extent for limiting the free lateral rolling motion of said ball, said ball being normally out of contact with said side wall, and means for forcing said follower and with it said ball toward said valve seat, said ball when unseated being capable of free rolling motion with respect to said bearing surface as limited by said side wall and being prevented from escaping from said recess by said side wall when unseated, said free rolling motion enabling said ball to present a different area of its surface to said valve seat at each seating action.

2. In a ball check valve, a valve housing including a bore terminating in a fluid passage provided with a valve seat, and an automatically operating ball check assembly arranged in said bore and including a follower and a ball, said ball arranged between said follower and said valve seat, said follower provided at its end adjacent to said ball with a recess of a diameter greater than the diameter of said ball and terminating in a flat bearing surface to receive and support said ball in free lateral rolling relation thereto, the depth of said recess being at least equal to the radius of said ball and providing a side wall of uniform diameter throughout its extent for limiting the free lateral rolling motion of said ball, said ball being normally out of contact with said side wall, and means for forcing said follower and with it said ball toward said valve seat, said ball when unseated being capable of free rolling motion with respect to said bearing surface as limited by said side wall and being prevented from escaping from said recess by said side wall when unseated, said free rolling motion enabling said ball to present a different area of its surface to said valve seat at each seating action.

3. In a ball check valve, a valve housing including a bore terminating in a fluid passage provided with a valve seat, and an automatically operating ball check assembly arranged in said bore and including a follower and a ball, said ball arranged between said follower and said valve seat, said follower provided at its end adjacent to said ball with a recess of a diameter greater than the diameter of said ball and terminating in a flat bearing surface to receive and support said ball in point contact and in free lateral rolling relation thereto, the depth of said recess being at least equal to the radius of said ball and providing a side wall of uniform diameter throughout its extent for limiting the free lateral rolling motion of said ball, said ball being normally out of contact with said side wall, and means for forcing said follower and with it said ball toward said valve seat, said ball when unseated being capable of free rolling motion with respect to said bearing surface as limited by said side wall and being prevented from escaping from said recess by said side wall when unseated, said free rolling motion enabling said ball to present a different area of its surface to said valve seat at each seating action.

4. In a ball check valve, a valve housing including a bore terminating in a fluid passage provided with a valve seat, and an automatically operating ball check assembly arranged in said bore and including a follower and a ball, said ball arranged between said follower and said valve seat, said follower being free in said bore and provided at its end adjacent to said ball with a recess of a diameter greater than the diameter of said ball and terminating in a bearing surface to receive and support said ball in free lateral rolling relation thereto, the depth of said recess being at least equal to the radius of said ball and providing a side wall of uniform diameter throughout its extent for limiting the free lateral rolling motion of said ball, said ball being normally out of contact with said side wall, said follower being provided with means for guiding it substantially axially of said bore, and means for forcing said follower and with it said ball toward said valve seat, said ball when unseated being capable of free rolling motion with respect to said bearing surface as limited by said side wall and being prevented from escaping from said recess by said side wall when unseated, said free rolling motion enabling said ball to present a different area of its surface to said valve seat at each seating action.

FRANK W. EDWARDS.